United States Patent [19]

Ducrot et al.

[11] 4,209,720
[45] Jun. 24, 1980

[54] ELECTRIC MOTORS SUPPLIED WITH CHOPPED CURRENT

[75] Inventors: Pol B. L. Ducrot, Garches; Jean-Paul Cloup, Sartrouville, both of France

[73] Assignees: Societe Anonyme Automobiles Citroen; Automobiles Peugeot, both of Paris, France

[21] Appl. No.: 719

[22] Filed: Jan. 3, 1979

[30] Foreign Application Priority Data

Jan. 11, 1978 [FR] France .................. 78 00702

[51] Int. Cl.$^2$ ................ H02K 1/04; H02K 1/12
[52] U.S. Cl. ................ 310/45; 310/40 R; 310/179; 310/216; 310/254; 310/271
[58] Field of Search ............. 310/40, 45, 271, 68 R, 310/179, 180, 216, 191–193, 254, 261, 264, 265, 273; 318/246–251, 491, 360, 538, 539

[56] References Cited

U.S. PATENT DOCUMENTS

| | | | |
|---|---|---|---|
| 2,351,316 | 6/1944 | Borden | 310/216 X |
| 3,225,269 | 12/1965 | Worcester | 336/207 X |
| 3,694,903 | 10/1972 | Deming | 310/216 X |
| 3,819,427 | 6/1974 | Balesch | 148/122 |
| 3,956,678 | 5/1976 | Byrne et al. | 310/216 X |

FOREIGN PATENT DOCUMENTS

| | | |
|---|---|---|
| 338903 | of 0000 | France . |
| 153588 | of 0000 | Switzerland . |
| 1143575 | of 0000 | United Kingdom . |

OTHER PUBLICATIONS

*Proceedings of IEE,* vol. 117, No. 2, Feb. 1970, Londres Byrne et al., "Compatible Controller–Motor System for Battery–Electric Vehicle", pp. 369-376.

*Primary Examiner*—Mark O. Budd
*Attorney, Agent, or Firm*—Stevens, Davis, Miller & Mosher

[57] ABSTRACT

A DC electric motor, intended to be supplied with a chopped current is arranged so that the bend of the representative curve of the magnetic flux with respect to the ampere-turns has its origin j situated, approximately, in the middle of the interval of use of the motor, and the radial dimension of the air-gap is sufficiently large for the flux increase, beyond the origin of the bend, with respect to the ampere-turns, to have a slope at least equal to substantially a third of the slope of the linear part B, which precedes the bend.

11 Claims, 4 Drawing Figures

ELECTRIC MOTORS SUPPLIED WITH CHOPPED CURRENT

The invention relates to DC electric motors intended to be fed with a chopped current, and comprising a rotor, forming an armature, adapted to rotate inside a stator, forming an inductor, comprising poles, the space between the rotor and the poles forming an air-gap, motors in which the representative curve of the magnetic flux passing through a pole of the stator, with respect to the ampere-turns of this pole, has an initial linear part followed by a bend.

The expression "chopped current" used above designates current pulses which may be variable in frequency and/or in width, which are often obtained from a DC source, such as electro-chemical generators, by means of a chopper circuit.

Such electric motors, particularly of the series type, are often used for vehicle traction.

The invention aims, especially, at making the motors in question such that they answer better than heretofore the different demands of practice and particularly such that they are better adapted to be fed with chopped current and that they provide, preferably, for the traction of a vehicle, a better torque characteristic at the different travelling speeds of the vehicle, with a low weight and a low price.

According to the invention, a DC electric motor, intended to be supplied with a chopped current, of the kind defined above, is characterized by the fact that it is arranged so that the bend of the representative curve of the magnetic flux with respect to the ampere-turns has an origin situated approximately in the middle of the interval of use of the motor, and that the radial dimension of the air-gap is sufficiently large for the flux increase, beyond the origin of the bend, with respect to the ampere-turns, to be at least equal to substantially a third of the increase of the linear part which precedes the bend.

In another aspect, a DC electric motor intended to be fed with a chopped current, in accordance with the invention, is characterized by the fact that the radial dimension of the air-gap is sufficiently large for the motor to keep, over the whole of its interval of use and in particular for the maximum current, an inductance sufficient to allow smoothing of the chopped supply current, which avoids the presence of an extra smoothing inductance.

For an electric motor whose power remains less than 20 kW or of the order of 20 kW, the radial dimension of the air-gap is greater than 1.2 mm and particularly equal to 1.5 mm.

A hoop, for maintaining the conductors in position in the rotor, is advantageously housed in the air-gap and surrounds the rotor along its circular periphery.

This hoop may be formed by impregnated fibre glass.

The slots of the rotor have preferably the simplified shape of a U and are wholly filled with conductors.

The rotor and the stator are advantageously formed by assemblies of laminated metal sheets; due to the relatively large size of the air-gap, it is possible to cut out, with the same punch stroke and in the same metal sheet, the parts of the stator and of the rotor.

The invention consists, apart from the arrangements outlined above, of certain other arrangements which will be more explicitly discussed hereafter in connection with particular embodiments described with reference to the accompanying drawings, but which are in no wise limiting.

FIG. 1, of these drawings, shows the curve of variation of the magnetic flux, passing through a pole of the stator, with respect to the ampere-turns of this pole, in a motor according to the invention.

Figure 4:
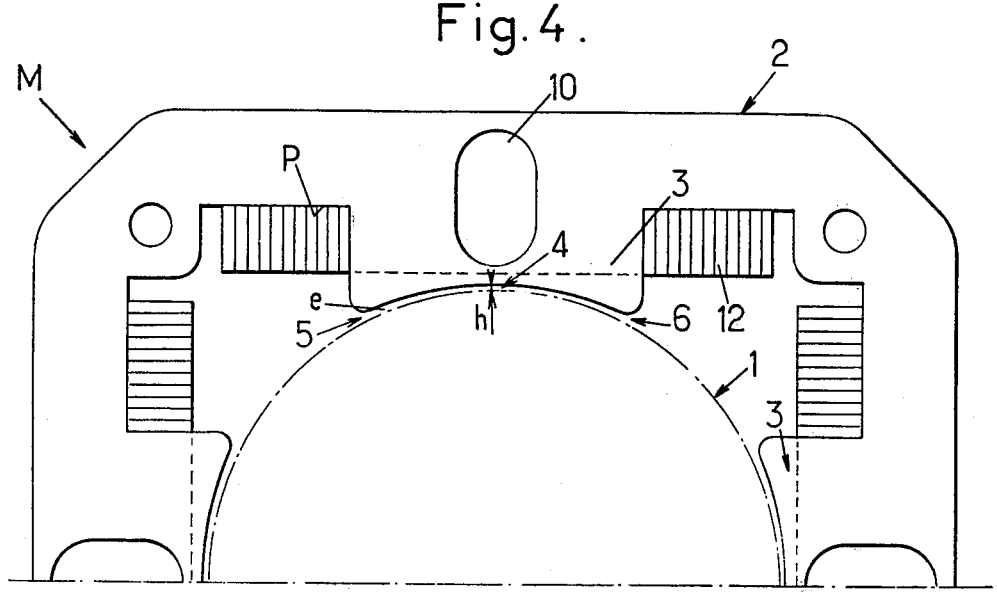

FIG. 4, finally, shows another embodiment of the stator.

Figure 3:
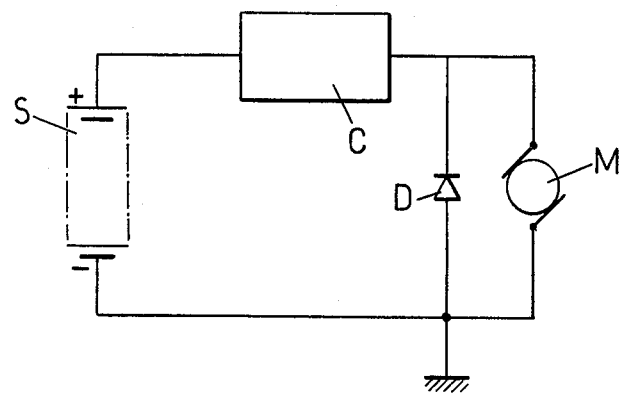
FIG. 3 is a simplified diagram showing the connection of the motor.

Referring to the drawings, there can be seen, shown schematically in FIG. 3, a DC electric motor M of the series type supplied with chopped current from a chopper C, itself fed from a DC source S, for example formed by accumulators. Such a motor M is often used for driving a vehicle, and the chopper C is then controlled by means not shown, so as to deliver current pulses whose width and/or frequency depend on the conditions of operation. A free-wheel diode D is connected, in a conventional way, to the terminals of the motor, as shown in the drawing.

Figure 2:
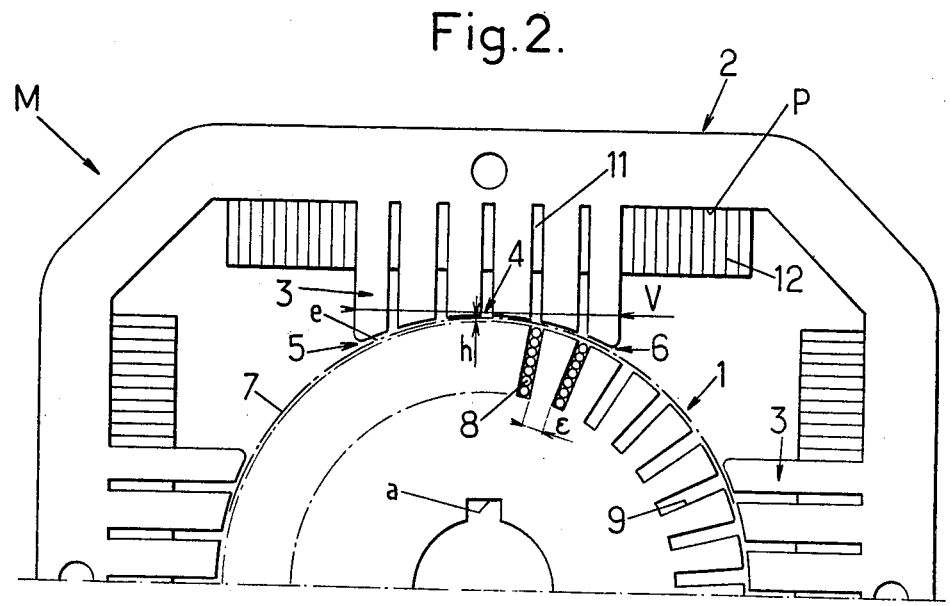
FIG. 2 is a partial view, in elevation, of the rotor and the stator of a motor in accordance with the invention.

Referring to FIG. 2, it can be seen that motor M comprises a rotor 1, forming an armature, adapted to rotate inside a stator 2 forming an inductor, and comprising poles 3. In the embodiment shown in FIG. 2, the number of poles is equal to four, but only the upper half of the stator and of the rotor have been drawn; the lower part is symmetrical to the upper part in relation to the lower dot-dash line of this FIG. 2, except for slot a provided in the rotor for keying.

Space e between rotor 1 and poles 3 forms an air-gap through which passes the magnetic flux $\Phi$ of each pole of the stator. This magnetic flux $\Phi$ depends on the ampere-turns of the pole in question, i.e. on the product Ni of the number N of conductor turns surrounding pole 3 by the intensity i of the current passing through these turns.

The representative curve G of the magnetic flux passing through a pole of the stator, with respect to the ampere-turns of this pole, has an initial linear part B (FIG. 1) which corresponds, for small currents, to a small saturation of the iron of the stator. This linear part is followed by a bend which corresponds to the beginning of higher saturation of the iron.

Figure 1:
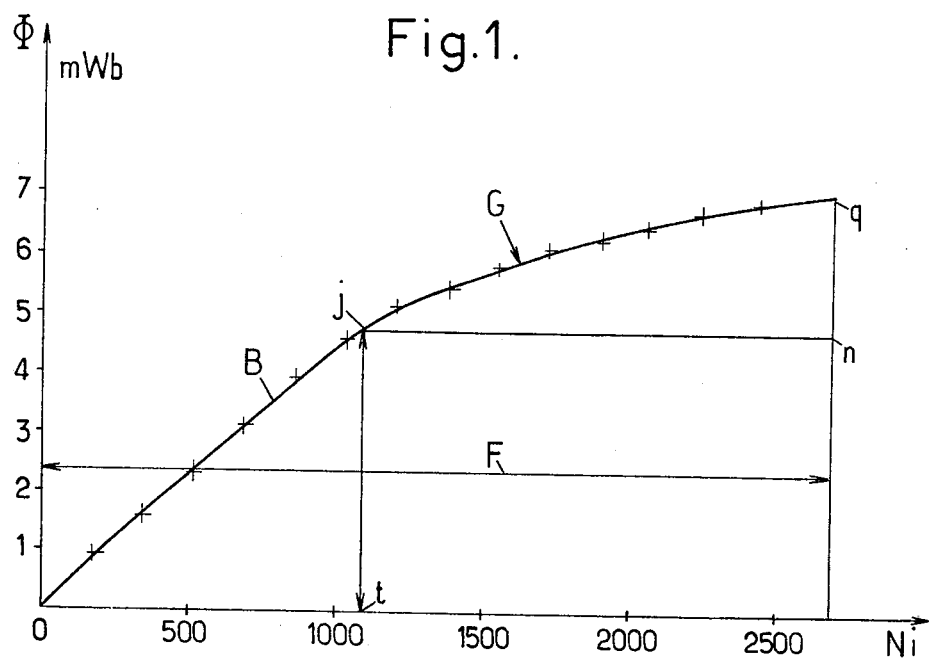

According to the invention, as can be seen in FIG. 1, the motor is arranged so that the bend of the representative curve G of the magnetic flux $\Phi$ with respect to the ampere-turns Ni, has an origin j situated approximately in the middle of the interval of use F of the motor; and the radial dimension h (FIG. 2) of the air-gap e is sufficiently large for the flux increase beyond the origin j of the bend, with respect to the ampere-turns, to be at least equal to substantially a third of the increase of the linear part B which precedes the bend.

The average slope of the flux beyond the origin j (or flux increase, beyond origin j, with respect to the ampere-turns) is equal, according to the graph of FIG. 1, to the relation between the lengths qn/jn.

The average slope (or flux increase with respect to the ampere-turns) of the linear part B is equal to the relation between the lengths jt/Ot.

We can thus write, according to the invention, that qn/jn is at least equal to ($\frac{1}{3} \times$ jt/Ot).

To be more explicit, the graph of FIG. 1 comprises as ordinates and abscissa numerical values corresponding to one embodiment of a traction motor having a power of the order of 15 kW. The magnetic flux Φ is expressed in mWb (milliwebers) on the Y-axis. It can be seen that the maximum flux of 7 mWb is obtained with 2700 ampere-turns approximately. The origin j of the bend has an abscissa of about 1200 ampere-turns, i.e. slightly less than the abscissa (1350 ampere-turns) of the middle of the 2700 ampere-turns interval of use of the motor.

The slope of the flux with respect to the ampere-turns is proportional to the inductance of the electric circuit of the pole of stator 2, since this inductance is proportional to the derivative of the flux in relation to the inductor current.

It appears then that in a motor according to the invention, the inductance of this motor keeps a sufficient value, beyond the origin j of the bend.

If L is the inductance of the motor for the linear part B which precedes the bend, this inductance remains at least equal to substantially L/3 beyond j.

Thus, the electric motor of the invention keeps, over the whole of its interval of use and in particular for the maximum current, a considerable inductance which allows smoothing of the chopped supply current supplied by chopper C.

This inductance may be sufficient to avoid the presence of an extra smoothing inductance which is usually disposed in series with the motor at the output of chopper C.

It should be noted that because of the presence of this air-gap e of considerable size, to obtain a given flux with a given current intensity, a larger number of turns of conductors surrounding the poles of the stator will be required. It is advantageous to use aluminium electrical conductors, at least for the inductor, so as to reduce the increase in weight caused by this higher number of turns.

For an electric motor whose power remains less than 20 kW, for example for a motor whose power is of the order of 15 kW, the radial dimension of the air-gap is advantageously greater than 1.2 mm and preferably equal to 1.5 mm.

An air-gap e may be provided whose radial dimension h passes through a minimum which, in any case, remains equal to or greater than the values previously mentioned, in the central zone 4 of the air-gap; h increases towards the peripheral ends 5, 6 of this air-gap.

A hoop 7, shown schematically, for maintaining the conductors 8 in position in the rotor is housed in the air-gap e and surrounds the rotor along its circular periphery. This hoop 7 may be formed by impregnated glass fiber.

It should be noted that this arrangement of the hoop in the air-gap, made possible because of the sufficient size of this air-gap, dispenses with the necessity of machining a groove in the rotor for housing the hoop.

To maintain the quality of the inductance of the motor, and to avoid eddy-current interference, the rotor and the stator are constituted by metal-sheet assemblies so as to form entirely laminated magnetic circuits.

Advantageously, the metal sheets used for the stacks forming the magnetic circuit are made from decarburized steel insulated by surface oxidisation.

Because of the relatively large dimension of air-gap e, it is possible to cut out, with the same punch stroke and from the same metal sheet, the elements of the rotor and of the stator without loss of material. The punch may in fact pass into the sufficiently wide space corresponding to the air-gap.

The slots 9 of the rotor have the simplified form of a U and are entirely filled with conductors 8 since hoop 7 is on the outside. The passage section for the flux of the rotor is satisfactory for the distance ε (FIG. 2) between the bases of two adjacent slots, which determines the minimum passage section for the flux, is sufficient.

The width V of the pole-shoe (FIG. 2) may be slightly reduced for, because of the relatively large size of the air-gap, the lines of magnetic flux coming from the pole open out sufficiently in this air-gap. The reduction of the width V, in relation to conventional motors, may be double the radial dimension of the air-gap.

Poles 3 are advantageously straight, as shown in FIGS. 2 and 4, i.e. without any difference of width between the pole and the pole-shoe, which facilitates the fitting on these poles of flat pre-formed coils 12 resting on flat surfaces P.

To reduce the weight of the motor, there is provided, in the magnetic circuit, essentially in the stator, recesses such as 10 (FIG. 4) shaped so as to keep only the iron section useful for the passage of the flux, and so as to reduce the influence of the armature reaction flux, which improves the switching.

In the embodiment of FIG. 2, instead of recess 10 of FIG. 4, there are provided notches such as 11, in the shape of a U, in poles 3.

It may be noted that to reduce the weight of the motor, the iron, forming the armatures of the stator and the rotor, is used in conditions of magnetic saturation, but the influence of this saturation remains negligible, as appears from FIG. 1, because of the size of the air-gap. The flux variation is modified by this saturation but it remains sufficient for the motor to keep an inductance capable of smoothing the chopped current.

Since the iron of the motor is operating in conditions of high saturation, ventilation (not shown) is permanently provided for the electric motor.

The type of motor in accordance with the invention is particularly suitable for the traction of a vehicle because of its advantageous torque characteristic for this kind of use and its lightness obtained by saturation of the iron.

The characteristics of the motor are improved by the linearization of the curve of the representative curve of the flux.

The efficiency of the motor of the invention, fed with chopped current is better than that of the conventional motor plus smoothing coil assembly, also supplied with chopped current; in such an assembly, the efficiency is reduced in relation to the motor of the invention, particularly because of the ohmic drop in the smoothing coil.

We claim:

1. A DC electric motor intended to be supplied with chopped current, comprising a rotor, forming an armature, adapted to rotate inside a stator, forming an inductor, comprising poles, the space between the rotor and the poles forming an air-gap, a motor in which the representative curve of the magnetic flux passing through a pole of the stator, with respect to the ampere-turns of this pole, has an initial linear part followed by a bend, characterized by the fact that it is arranged so that the bend of the representative curve of the magnetic flux with respect to the ampere-turns has its origin situated approximately in the middle of the interval of use of the motor, and that the radial dimension of the air-gap is sufficiently large for the flux increase, beyond the origin of the bend, with respect to the ampere-turns, to be at least equal to substantially a third of the flux increase in the linear part which precedes the bend.

2. An electric motor according to claim 1, characterized by the fact that the radial dimension of the air-gap is sufficiently large for the motor to keep, over the whole of its interval of use, and in particular for the maximum current, an inductance sufficient for smoothing the chopped supply current, which avoids the presence of an extra smoothing inductance.

3. An electric motor according to claim 2, whose power remains less than or of the order of 20 kW, characterized by the fact that the radial dimension of the air-gap is greater than 1.2 mm and particularly equal to 1.5 mm.

4. An electric motor according to claim 1, comprising a hoop for maintaining the conductors in position in the rotor, characterized by the fact that the hoop is housed in the air-gap and surrounds the rotor along its circular periphery.

5. An electric motor according to claim 4, characterized by the fact that the hoop is formed by impregnated glass fiber.

6. An electric motor according to claim 1, characterized by the fact that the rotor is provided with slots having the simplified form of a U and are wholly filled with conductors.

7. An electric motor according to claim 1, whose poles have a simplified straight shape without pole-shoe allowing the fitting of flat pre-formed coils, characterized by the fact that the width of the poles is reduced, particularly by double the radial dimension of the air-gap in relation to that of a conventional motor.

8. An electric motor according to claim 1, characterized by the fact that at least the electrical conductors of the inductor are made from aluminium.

9. An electric motor according to claim 1, characterized by the fact that the magnetic circuit is formed by a stack of metal sheets made from decarburized steel insulated by surface oxidization.

10. An electric motor according to claim 1, characterized by the fact that the magnetic circuit, particularly the stator, comprises recesses formed so as to keep only the iron section useful for the passage of the magnetic flux and so as to reduce the influence of the armature reaction flux.

11. A process for producing the elements of the rotor and of the stator according to claim 1, characterized by the fact that the elements of the rotor and of the stator are cut out, with the same punch stroke, passing through the space corresponding to the air-gap, from the same metal sheet.

* * * * *